(12) United States Patent     (10) Patent No.:   US 12,676,528 B2

Ivan et al.     (45) Date of Patent:     Jul. 7, 2026

(54) ELECTRIC MACHINE INCLUDING A DIELECTRIC LAYER ARRANGED BETWEEN A STATOR AND A HOUSING

(71) Applicant: GM GLOBAL TECHNOLOGY OPERATIONS LLC, Detroit, MI (US)

(72) Inventors: William T. Ivan, Shelby Township, MI (US); Alireza Fatemi, Canton, MI (US); Rajeev Vyas, Rochester Hills, MI (US); Alan Del Rio, Clawson, MI (US); Rebecca K. Risko Cattell, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 474 days.

(21) Appl. No.: 18/355,743

(22) Filed: Jul. 20, 2023

(65) Prior Publication Data

US 2025/0030300 A1     Jan. 23, 2025

(51) Int. Cl.
    *H02K 5/08*       (2006.01)
    *H02K 15/14*     (2006.01)

(52) U.S. Cl.
    CPC ............... *H02K 5/08* (2013.01); *H02K 15/14* (2013.01)

(58) Field of Classification Search
    CPC .......... H02K 5/08; H02K 15/14; H02K 1/185; H02K 21/16; H02K 5/12; H02K 3/522; F04B 39/00; F04B 39/12; F04B 35/04
    See application file for complete search history.

(56) References Cited

U.S. PATENT DOCUMENTS 3,228,597 A * 1/1966 Walker ..................... H02K 7/16
                                         310/90
2022/0239181 A1* 7/2022 Morgen ................... H02K 5/16
2025/0030319 A1* 1/2025 Bohnen .................... H02K 3/50

FOREIGN PATENT DOCUMENTS

DE     202009015119 U1     3/2011
DE     202016104500 U1 * 8/2016 ............. C23C 4/134
DE     102019205752 A1   10/2020
DE     102019118122 A1    1/2021
DE     102020120851 A1    2/2022
DE     102021131195 A1 * 6/2023 ............. H02K 1/185

OTHER PUBLICATIONS

DE-102021131195-A1 machine translation, Nov. 14, 2025.*
DE-202016104500-U1 machine translation, Nov. 14, 2025.*
German Search Report dated Jun. 19, 2024.

* cited by examiner

*Primary Examiner* — Leda T Pham
(74) *Attorney, Agent, or Firm* — Quinn IP Law

(57)          ABSTRACT

A multi-phase, multi-pole permanent magnet motor/generator (electric machine) is described, and includes a rotor disposed on a rotor shaft within an annular stator, which may be arranged in a housing with an interposed insulator system. The insulator system is arranged to mitigate and isolate common mode currents in a shaft bearing system by insulating the stator core from an electrical ground return path of an electrical driving source. The electric machine includes a rotor rotatably disposed within a stator, and the stator is secured to the housing with the insulator system interposed therebetween.

18 Claims, 3 Drawing Sheets

ELECTRIC MACHINE INCLUDING A DIELECTRIC LAYER ARRANGED BETWEEN A STATOR AND A HOUSING

INTRODUCTION

Electric multi-phase rotary motor/generators, e.g., permanent magnet (PM) electric machines may be employed as torque generative devices on vehicles.

In an electric machine, traction torque or reactive torque may be generated by multiple alternating current (AC) waveforms that pass through three or more phase leads. A power inverter may be configured to generate multiple AC waveforms that operate at the same frequency and amplitude, but with a time offset or phase shift between the different phases. In a vehicle or other system using an electric machine, the power inverter generates phased AC waveforms that are transferred to individual stator windings of the rotary electric machine to induce a changing magnetic field. This magnetic field causes the rotation of a rotor to occur, which in turn provides motor output torque or regenerative torque. The motor output torque may be harnessed and directed to perform useful work, e.g., propelling the vehicle.

Under some operating conditions, common mode electrical power may be generated and transferred through bearings of the rotary electric machine. This may lead to deterioration of the bearings, which may be in the form of fluting, pitting, or other effects. This deterioration of the bearings may cause issues related to noise and vibration, may lead to a bearing fault that may require service, and/or may decrease service life of a rotary electric machine.

SUMMARY

A multi-phase, multi-pole permanent magnet motor/generator (electric machine) is described, and includes a rotor disposed on a rotor shaft within an annular stator, which may be arranged in a housing with an interposed insulator system. The insulator system is arranged to mitigate and isolate common mode currents in a shaft bearing system by insulating the stator core from an electrical ground return path of an electrical driving source. Insulating the stator core from the housing, e.g., a drive unit casing, reduces common mode currents. Reducing the common mode currents from the stator core system reduces or eliminates common mode currents and deleterious effects associated therewith.

An aspect of the disclosure may include a drive unit for a vehicle that includes an electric machine arranged in a housing; and an insulator system. The electric machine includes a rotor rotatably disposed within a stator, and the stator is secured to the housing with the insulator system interposed therebetween. The rotor is rotatably or otherwise coupled to an element of a driveline.

Another aspect of the disclosure may include the insulator system being a dielectric layer that is arranged between the stator and the housing, wherein the dielectric layer electrically isolates the stator from the housing.

Another aspect of the disclosure may include the dielectric layer being fabricated from a polymeric material.

Another aspect of the disclosure may include the dielectric layer that is arranged between the stator core and the housing having an impedance that is greater than a predetermined minimum resistance threshold, wherein the magnitude of the predetermined resistance threshold minimizes a common mode electrical power transferred through the bearing system.

Another aspect of the disclosure may include the dielectric layer that is arranged between the stator core and the housing having an impedance that is greater than a predetermined minimum resistance threshold at a predefined excitation frequency, wherein the magnitude of the predetermined resistance threshold and the magnitude of the predefined excitation frequency minimize a common mode electrical power transferred through the bearing system.

Another aspect of the disclosure may include the dielectric layer that is arranged between the stator and the housing having an impedance that is greater than a hard short.

Another aspect of the disclosure may include the dielectric layer arranged between the stator and the housing being a dielectric spacer, wherein the dielectric spacer is interposed between the stator and the housing.

Another aspect of the disclosure may include the stator being a plurality of lamination plates arranged in a stack, with the stack having a first end and a second end. The insulator system includes a dielectric spacer; and the stator is secured to the housing, including the first end of the plurality of lamination plates arranged in the stack being secured to the housing with the dielectric spacer being interposed therebetween.

Another aspect of the disclosure may include the stator including a plurality of lamination plates arranged in a stack; wherein the plurality of lamination plates arranged in the stack have a plurality of mounting bosses; wherein the stator is secured to the housing via a plurality of fasteners that are arranged in the plurality of mounting bosses and coupled to the housing; and wherein the insulator system includes a plurality of dielectric fastener encapsulators. The stator is secured to the housing via the plurality of fasteners with the plurality of dielectric fastener encapsulators interposed therebetween.

Another aspect of the disclosure may include the rotor being coupled to a rotatable element of the driveline to transfer tractive torque to a drive wheel.

Another aspect of the disclosure may include an electric machine that is arranged in a housing. The electric machine includes a rotor, a stator, and an insulator system, wherein the rotor is rotatably arranged within the stator, and the stator includes a stator core and a plurality of field windings. The insulator system is interposed between the stator core and the housing.

Another aspect of the disclosure may include the electric machine being a multiphase permanent magnet electric machine.

Another aspect of the disclosure may include a method for assembling a permanent magnet electric machine, including inserting a rotor into an aperture defined by a stator core, including interposing a plurality of concentrically-disposed spacers between the rotor and the stator core; inserting the stator core into a housing, including interposing a dielectric sleeve between the stator core and the housing; securing the stator core onto the housing; and removing plurality of concentrically-disposed spacers from between the rotor and the stator core.

Another aspect of the disclosure may include interposing a dielectric insulator system between the stator core and the housing prior to inserting the stator core into the housing, wherein the dielectric insulator system includes a plurality of dielectric fastener encapsulators and a dielectric spacer.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

The appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description to provide a thorough understanding of the embodiments disclosed herein, some embodiments may be practiced without some of these details. Moreover, for the purpose of clarity, certain technical material that is understood in the related art has not been described in detail to avoid unnecessarily obscuring the disclosure. Furthermore, the disclosure, as illustrated and described herein, may be practiced in the absence of an element that is not specifically disclosed herein.

As used herein, the term "system" refers to mechanical and electrical hardware, software, firmware, electronic control componentry, processing logic, and/or processor device, individually or in combination, including without limitation: application specific integrated circuit (ASIC), an electronic circuit, a processor (shared, dedicated, or group) that executes one or more software or firmware programs, memory device(s) that electrically store software or firmware instructions, a combinatorial logic circuit, and/or other components that provide the described functionality.

As used herein, the term "electric machine" refers to an electric motor/generator device, including a rotor and a stator arranged in a housing, that is capable of converting electric power to mechanical power, e.g., rotational torque, and/or is capable of converting mechanical power, e.g., rotational torque, to electric power by electromagnetic effort. In one embodiment, the electromagnetic motor/generator includes a rotor that rotates in relation to a stator to effect work. In one embodiment, the electromagnetic motor/generator includes a rotor that translates in relation to a stator to effect work.

Figure 1:
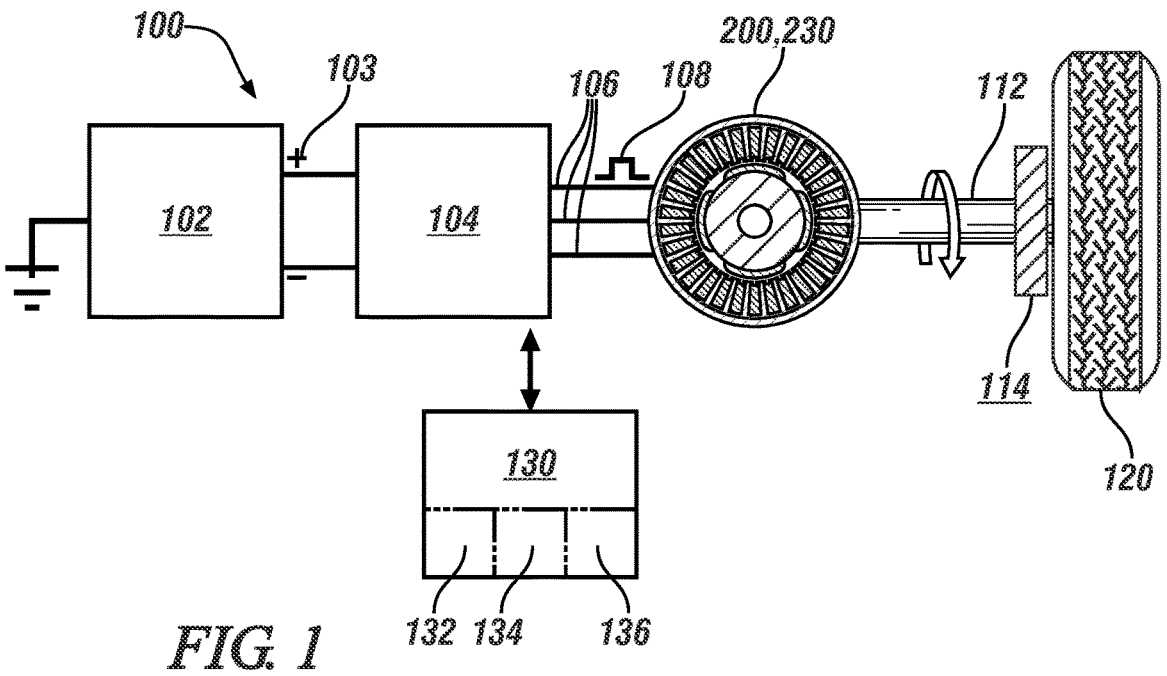
FIG. 1 is a schematic illustration of a system including a multi-phase, multi-pole permanent magnet motor/generator (electric machine), a DC power source, an inverter, and a controller, in accordance with the present disclosure.

Referring to the drawings, wherein like reference numbers refer to the same or like components in the several Figures, FIG. 1 schematically illustrates a system 100 that includes a multi-phase, multi-pole, rotary permanent magnet electric motor/generator (electric machine) 200 that is arranged in housing 230 to generate and transfer torque to an actuator 120 to effect work, and a controller 130 that executes control routines to control and manage operation thereof. In one embodiment, the system 100 is disposed on a vehicle (not shown). When disposed on a vehicle, the vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure. Alternatively, the system 100 may be an element of a stationary system.

The system 100 also includes an inverter 104 and a DC power source 102. The DC power source 102 connects to the inverter 104 via a high-voltage DC bus 103, and the inverter 104 connects to the electric machine 200 via a plurality of electrical power lines 106.

The inverter 104 includes a plurality of semiconductor switches (not shown) that are arranged and controllable to transform DC electric power to AC electric power, and transform AC electric power to DC electric power, employing a pulsewidth modulation signal 108 or another control technique. The inverter 104 is arranged and is controllable to transform DC electric power originating from the DC power source 102 to AC electric power to actuate the electric machine 200 via electromagnetic effort. The electric machine 200 is controllable to rotate and generate mechanical torque that is transferred via a rotatable member 112 and a geartrain 114 to the actuator 120 when operating in a torque generating mode. The electric machine 200 is controllable to generate AC electric power from mechanical torque originating at the actuator 120 via electromagnetic effort, which is transformed by the inverter 104 to DC electric power for storage in the DC power source 102 when operating in an electric power generating mode. The actuator 120 includes, in one embodiment, a vehicle wheel that transfers torque to a ground surface to effect forward motion as part of a traction propulsion system. The DC power source 102 may be in the form of a rechargeable electrochemical battery device, a fuel cell, an ultracapacitor, and/or another electrical energy storage/generation technology.

The controller 130 may be embodied as one or more digital computing devices, and may include one or more processors 134 and memory 132. A control routine 136 may be stored as an executable instruction set in the memory 132 and executed by one of the processors 134 of the controller 130. The controller 130 is in communication with the inverter 104 to control operation thereof in response to execution of the control routine 136 to operate the electric machine 200.

The term "controller" and related terms such as microcontroller, control module, module, control, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated memory component(s) in the form of transitory and/or non-transitory memory component(s) and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that may be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables.

Figure 2:
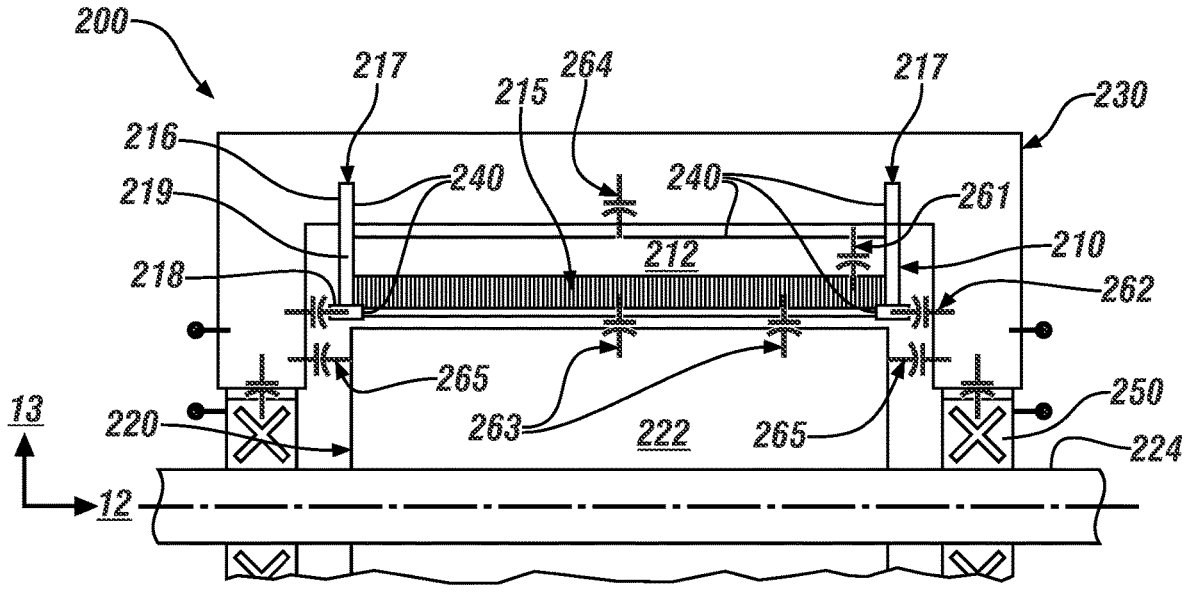
FIG. 2 illustrates a side view of an embodiment of an electric machine including an insulator system, in accordance with the disclosure.
Figures 3, 4:
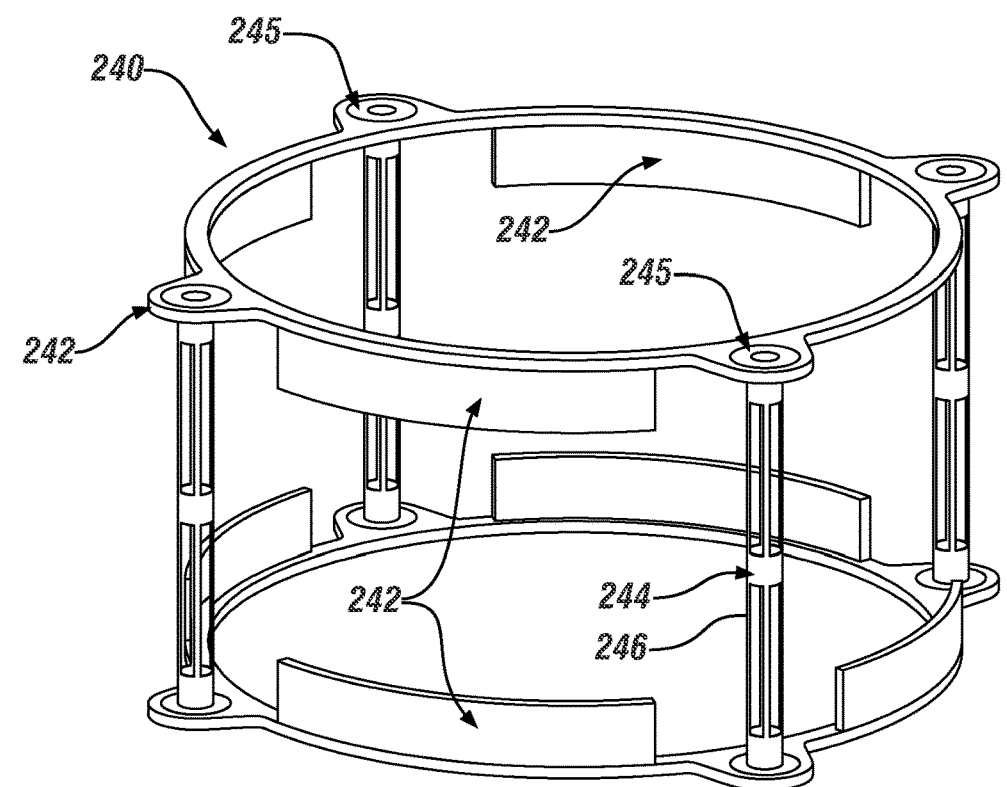
FIG. 3 illustrates an isometric view of an embodiment of a stator and insulator system for an electric machine, in accordance with the disclosure.
FIG. 4 illustrates an isometric view of an embodiment of an insulator system for an electric machine, in accordance with the disclosure.

FIGS. 2, 3, and 4, with continued reference to elements of an embodiment of the system 100 that is described with reference to FIG. 1, schematically illustrate various elements of an embodiment of the electric machine 200, including stator assembly 210 and rotor assembly 220, which is arranged in housing 230 with an insulator system 240 interposed therebetween.

The electric machine 200 is illustrated in context of a radial axis 13 and a longitudinal axis 12, wherein the longitudinal axis 12 is defined by a rotor shaft 224.

The rotor assembly 220 includes a cylindrically-shaped rotor core 222 that is arranged on the rotor shaft 224 and is disposed within a cylindrically-shaped opening formed by the stator body 210, wherein the rotor assembly 220 is coaxial with a rotor opening that is formed in the stator 210. The rotor shaft 224 is arranged on a bearing system 250 that is secured to the housing 230 to facilitate rotation of the rotor assembly 220 within the stator assembly 210 and the housing 230. The bearing system 250 may be composed of sleeve bearings, ball bearings, tapered bearings, or other bearing devices. Other elements of the electric machine 200, e.g., end caps, electrical connections, etc., are included but not shown.

The stator assembly 210 includes a stator core 212 and a plurality of field windings 215. The stator assembly 210 is composed as a distributed electric winding assembly that is arranged to provide a revolving electrical field that provides a rotating magnetic field in the plurality of field windings 215 by applying a polyphase alternating current. The plurality of field windings 215 are electrically connected to the inverter 104 described with reference to FIG. 1 via the plurality of electrical power lines 106. In one embodiment, the polyphase alternating current is a three-phase alternating current.

The plurality of field windings 215 are circumferentially arranged. The electrical windings are electrically connected to the inverter 104, which is controlled by controller 130 to generate rotating electrical fields that induce magnetic fields adjacent to the rotor 220 and interact with the magnetic field of permanent magnets arranged in the rotor assembly 220 to generate mechanical torque that is transferred to rotor shaft 224. The rotary electric machine 200 may be controlled to operate as a torque motor and/or an electric power generator.

The stator core 212 is configured as a plurality of lamination plates that are arranged in a stack having a first end 213 and a second end 214 in one embodiment. The plurality of lamination plates arranged in the stack have a plurality of mounting bosses 216 that are arranged around an outer periphery of the stator core 212. Each of the mounting bosses 216 includes an aperture 215 into which a fastener 217 may be inserted. Alternatively, the stator core 212 may be fabricated from a soft magnetic composite (SMC) material having similar features. Alternatively, the stator core 212 may be fabricated from other material employing another fabrication technique resulting in features similar to those of the laminated stack.

The stator core 212, and thus the stator assembly 210, is secured to the housing 230 via the fasteners 217, which are coupled to bosses 232 that are attached to the housing 230. Each of the fasteners 217 may be configured as a threaded screw having a head portion 218 and an elongated shank portion 219 that is threaded on the end and is able to interact with a threaded portion of one of the bosses 232 in the housing 230 in one embodiment. Alternatively, the plurality of fasteners 217 may be configured as latches (e.g., quarter-turn latches), cam locks, compression latches, rivets, etc., or another fastener configuration having a head portion 218 and a shank portion 219 that is arranged to interact with a corresponding boss configuration in the housing 230.

The insulator system 240 is interposed between the stator core 212 of the stator 210 and the housing 230.

The insulator system 240 includes one or multiple dielectric spacer(s) 242, and a plurality of dielectric fastener encapsulators 244.

The function of the one or multiple dielectric spacer(s) 242, and plurality of dielectric fastener encapsulators 244 is to electrically isolate elements of the stator 210, the stator core 212, and the field windings 215 from the housing 230.

The dielectric spacer(s) 242 is interposed between the stator core 212 of the stator 210 and the housing 230.

The plurality of dielectric fastener encapsulators 244 are arranged in the plurality of mounting bosses 216 and coupled to the housing 230. The plurality of fasteners 217 secure the stator core 212 of the stator 210 to the housing 230 with the plurality of dielectric fastener encapsulators 244 interposed therebetween.

Each of the dielectric fastener encapsulators 244 includes a washer portion 245 that is interposed between the head portion 218 of the fastener 217, in one embodiment.

Each of the dielectric fastener encapsulators 244 may include a sleeve portion 246 that is interposed between shaft portion 219 of the fastener 217 and edges of the mounting bosses 216 that define the apertures 215.

The dielectric fastener encapsulators 244 serve to isolate the fasteners 217 from the mounting bosses 216 by ensuring that there is dielectric material therebetween, and that there is a minimum distance therebetween to providing electrical decoupling.

The dielectric fastener encapsulators 244 serve to isolate the fasteners 217 by ensuring that there is a minimum distance between the shaft portions 219 and the edges of the mounting bosses 216, and a minimum distance or clearance between the fastener heads 218 of the fasteners 217 and the surfaces of the mounting bosses 216.

The bolt insulation may also be accomplished by using electrically non-conductive brackets, or mounting interfaces that could also function as a vibration suppressant. The end brackets may be fabricated from dielectric material and/or isolated with dielectric layers.

The insulator system 240 provides a dielectric layer that is arranged between the stator 210 and the housing 230 to electrically isolate the stator 210 from the housing 230. The dielectric spacer(s) 242 and the plurality of dielectric fastener encapsulators 244 are formed from dielectric material. A dielectric material is a material that supports an electrical charge without conducting it to a significant degree. Dielectric properties of a material are a measure of the potential for charge movement inside the material in response to an external electric field. Examples of dielectric materials include plastic/polymers, including glass-filled polymers. In one embodiment, the dielectric layer associated with the insulation system 240 that is arranged between the stator 210 and the housing 230 is fabricated from a polymeric material. In one embodiment, the dielectric layer associated with the insulation system 240 that is arranged between the stator 210 and the housing 230 has an impedance that is greater than a predetermined resistance threshold at a predefined excitation frequency, wherein the magnitudes of predetermined resistance threshold and the predefined excitation frequency are determined to avoid achieving i.e., minimize or eliminate a common mode electrical power that is generated and/or transferred through bearings of the rotary electric machine that may lead to deterioration of the bearings, which may be in the form of fluting, pitting, or other effects.

In one embodiment, the dielectric layer associated with the insulation system 240 that is arranged between the stator 210 and the housing 230 has an impedance that is greater than a predetermined minimum resistance threshold.

In one embodiment, the predetermined minimum resistance threshold is greater than a hard short.

In one embodiment, the predetermined minimum resistance threshold is greater than 1 ohm.

In one embodiment, the predetermined minimum resistance threshold is greater than 1 milliohm.

In one embodiment, the predetermined minimum resistance threshold is 1 ohm at an excitation frequency having an order of magnitude of 1 MHZ.

In one embodiment, the predetermined minimum resistance threshold is 100 ohms at an excitation frequency having an order of magnitude of 1 MHZ.

The thicknesses of the elements of the insulation system 240 and the clearances are determined such that the impedance between the stator core 212 and the housing 230 is at least the predetermined minimum resistance threshold. To increase the impedance, a thicker insulation and/or larger clearances may be employed.

During operation, electromagnetic forces that are induced in the field windings 215 introduce magnetic flux that acts upon permanent magnets that are arranged in or on the rotor assembly 220, thus exerting a torque to cause the rotor assembly 220 to rotate about the rotor shaft 224 within the stator 210. Alternating current (AC) motors may be divided generally into AC induction motors and AC synchronous motors. In a revolving field type of AC synchronous motor in which a stator is provided with armature windings and a rotor assembly is provided with magnet windings, the rotor assembly is changed to an electromagnet by excitation of the magnet windings of the rotor assembly, and the rotor assembly rotates by applying a polyphase alternating current to the stator. In applications wherein the electric power originates from a DC power supply, the polyphase alternating current is generated by the power inverter.

The field windings 215 of the stator 210 are arranged with a quantity of electrical phases and a quantity of electrical turns per phase. Depending on the specific arrangement, the quantity of electrical phases may be between 3 and 6, and the quantity of layers of conductors may be between 4 and 12.

The stator 210 includes a plurality of stamped, ferrous laminate sheets, each of which is a disk-shaped device formed from electrical steel and having a uniform thickness, and each has a centrally-located inner aperture that is formed to dimensionally accommodate an outer diameter of the rotor assembly 220.

Specific geometric design parameters associated with the rotor assembly 220 and the stator assembly 210 of the electric machine 200 are selected to achieve motor operating parameters that include a high drive-cycle efficiency, e.g., greater than 90% peak efficiency over a wide operational area, a high torque density, a wide peak power range, a maximum speed of 21,000 rpm or greater.

Figure 5:
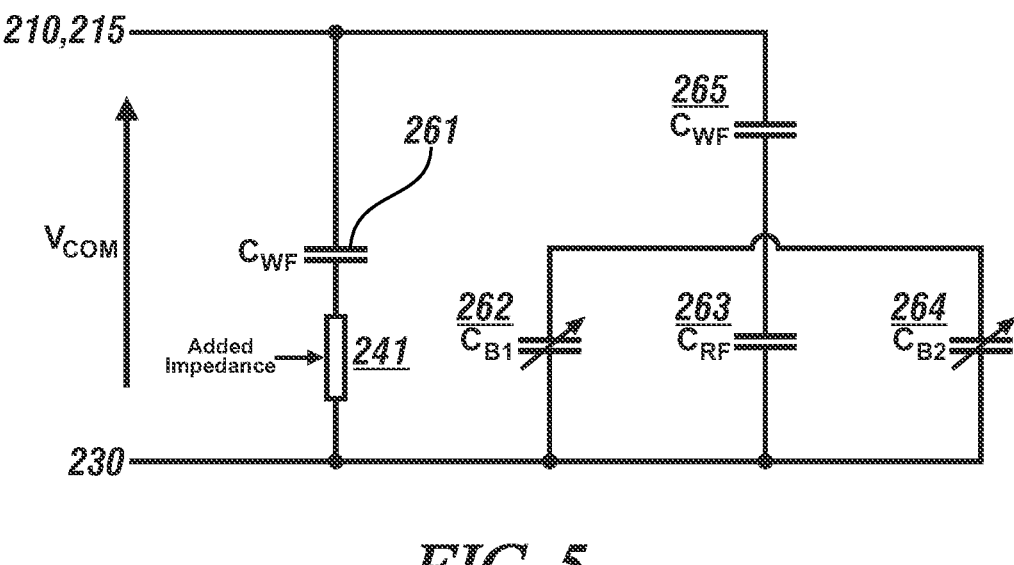
FIG. 5 schematically illustrates an equivalent circuit of an embodiment of a stator and insulator system for an electric machine, in accordance with the disclosure.

FIG. 5 schematically illustrates an equivalent circuit of an embodiment of the electric machine 200 that is described with reference to FIGS. 2, 3, and 4, including stator 210 with core 212 and field windings 215, rotor 220, housing 230, insulator system 240, and bearing system 250. The equivalent circuit includes a plurality of capacitive couplings 260 between the field windings 215 of the stator 210 and the housing 230, which may lead to generation of common mode electrical power that may be transferred through the bearing system 250 of the rotary electric machine 200, leading to deterioration thereof.

The plurality of capacitive couplings 260 includes a first capacitive coupling $C_{WF}$ 261 between the housing 230 and the field windings 215. A second capacitive coupling between the housing 230 and the field windings 215 may occur via the rotor 220, and includes a first variable capacitance $C_{B1}$ 262, a second variable capacitance $C_{RF}$ 263, a third variable capacitance $C_{B2}$ 264 arranged in parallel, and also arranged in series with a rotor-housing capacitance $C_{WR}$ 265.

The addition of impedance 241 due to the insulation system 240 additively increases the total impedance between the field windings 215 of the stator 210 and the housing 230.

Figure 6:
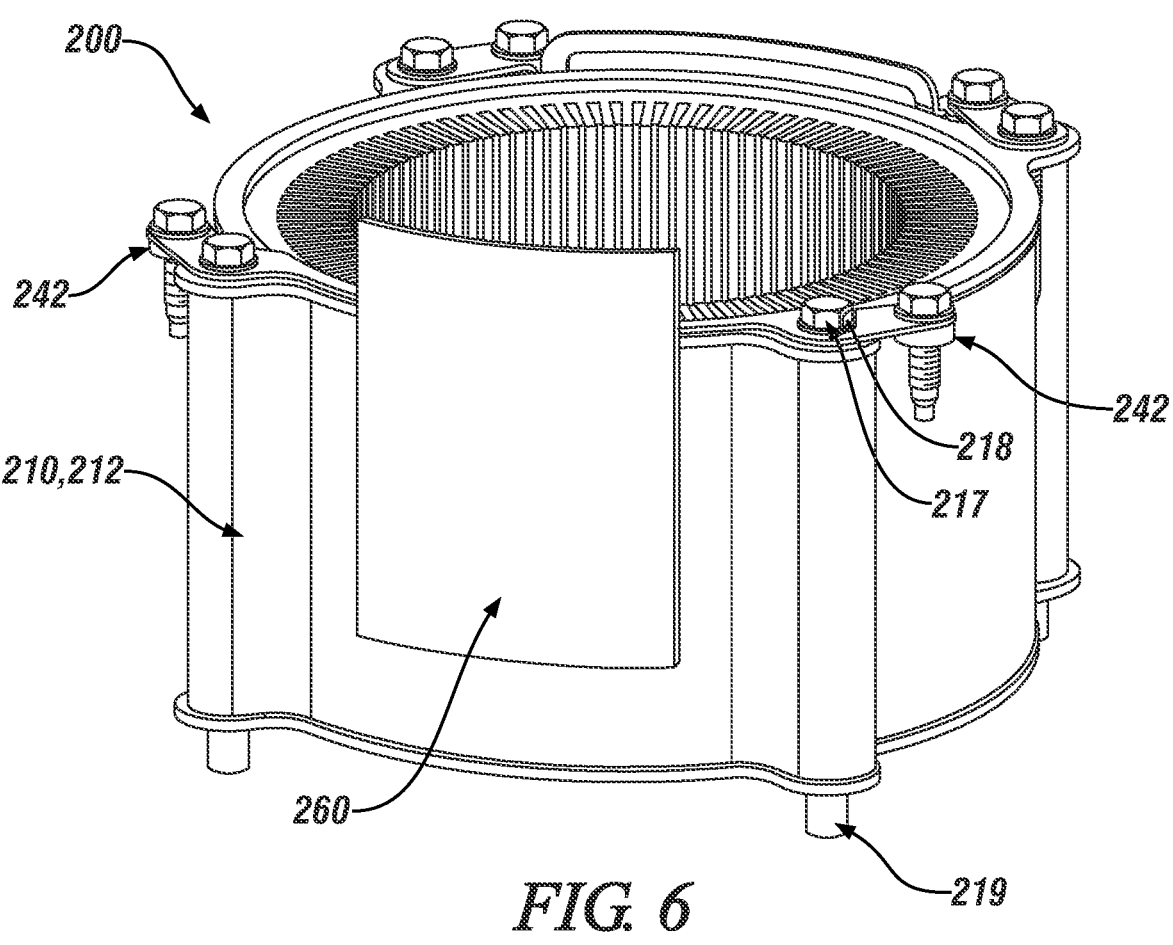
FIG. 6 schematically illustrates an isometric view of an embodiment of a stator and insulator system for an electric machine, including an assembly spacer tool, in accordance with the disclosure.

FIG. 6 schematically illustrates an isometric view of an embodiment of a stator and insulator system for an embodiment of the electric machine 200, including an assembly spacer tool 610. During assembly of the electric machine 200, the dielectric insulator system 240 is interposed between the stator core 212 and the housing 230 of the electric machine 200 prior to inserting the stator 210 including the stator core 210 into the housing 230. Furthermore, an assembly spacer tool 260 is interposed between the housing 230 and the stator core 212 during a portion of motor assembly that includes securing the stator core onto the housing. The assembly spacer tool 260 may be in the form of a plurality of dielectric spacers or a dielectric sleeve.

The assembly spacer tool 260 is employed to center the stator 210 within the housing 230, and prevent physical contact between the housing 230 and the stator core 212. When the assembly spacer tool 260 is in the form of a plurality of spacers, it may be removed before assembling the rotor 220 in one embodiment. When the assembly spacer tool 260 is in the form of a dielectric sleeve, it may remain in place after assembly.

The assembly spacer tool 260 is employed to maintain concentricity between the stator 210 and housing 230 during assembly, and prevent physical contact therebetween. In one embodiment, the assembly spacer tool 260 is fabricated from metal, in an embodiment wherein the assembly spacer tool 260 is removed after assembly. Alternatively, the assembly spacer tool 260 is fabricated from dielectric material, in an embodiment wherein the assembly spacer tool 260 remains in place after assembly.

Embodiments of the multi-phase, multi-pole permanent magnet electric machine described herein includes a rotor disposed on a rotor shaft within an annular stator and arranged in a housing with an interposed insulator system.

The insulator system is arranged to mitigate and isolate common mode currents in a shaft bearing system by insulating the stator core from an electrical ground return path. Insulating the stator core from the housing, e.g., a drive unit casing, reduces common mode currents. Reducing the common mode currents from the stator core system reduces or eliminates common mode currents and deleterious effects associated therewith. Furthermore, embodiments of the electric machine described herein are configured to simultaneously achieve operating parameters related to torque, speed, power, efficiency, packaging and other constraints, while meeting other performance criteria such as torque density, high drive-cycle efficiency, protection against permanent demagnetization, and minimum torque ripple.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A drive unit for a vehicle, comprising:
an electric machine arranged in a housing; and
an insulator system;
wherein the insulator system includes a plurality of dielectric fastener encapsulators;
wherein the electric machine includes a rotor rotatably disposed within a stator;
wherein the stator has a plurality of mounting bosses;
wherein the stator is secured to the housing with the insulator system interposed therebetween;
wherein the stator is secured to the housing via a plurality of fasteners that are arranged in the plurality of mounting bosses and coupled to the housing, wherein the plurality of fasteners secure the stator to the housing with the plurality of dielectric fastener encapsulators interposed therebetween; and
wherein the rotor is coupled to a driveline.

2. The drive unit of claim 1, wherein the insulator system being interposed between the stator and the housing comprises the insulator system being a dielectric layer that is arranged between the stator and the housing, wherein the dielectric layer electrically isolates the stator from the housing.

3. The drive unit of claim 2, wherein the dielectric layer that is arranged between the stator and the housing is fabricated from a polymeric material.

4. The drive unit of claim 2, wherein the dielectric layer that is arranged between the stator and the housing has an impedance that is greater than a predetermined minimum resistance threshold, wherein the magnitude of the predetermined minimum resistance threshold is selected to minimize a common mode electrical power transferred through the bearing system.

5. The drive unit of claim 2, wherein the dielectric layer that is arranged between the stator and the housing has an impedance that is greater than a predetermined minimum resistance threshold at a predefined excitation frequency, wherein the magnitude of the predetermined minimum resistance threshold is selected to minimize a common mode electrical power transferred through the bearing system.

6. The drive unit of claim 2, wherein the dielectric layer that is arranged between the stator and the housing has an impedance that is greater than a predetermined minimum resistance threshold, wherein the magnitude of the predetermined minimum resistance threshold is greater than a hard short.

7. The drive unit of claim 2, wherein the dielectric layer arranged between the stator and the housing comprises a dielectric spacer, wherein the dielectric spacer is interposed between the stator and the housing.

8. The drive unit of claim 1, wherein:
the stator includes a plurality of lamination plates arranged in a stack;
the plurality of lamination plates arranged in the stack have a first end and a second end;
the insulator system includes a dielectric spacer; and
the stator is secured to the housing with the insulator system interposed therebetween, including the first end of the plurality of lamination plates that are arranged in the stack being secured to the housing with the dielectric spacer being interposed therebetween.

9. The drive unit of claim 1, wherein the rotor being coupled to the driveline comprises the rotor being coupled to a rotatable element of the driveline to transfer tractive torque to a drive wheel.

10. An electric machine, the electric machine comprising:
a rotor, a stator, a housing, a bearing system, and an insulator system;
wherein the stator and the bearing system are arranged within the housing;
wherein the rotor is rotatably arranged within the stator employing the bearing system;
wherein the stator includes a stator core and a plurality of field windings;
wherein the insulator system is interposed between the stator core and the housing;
wherein the stator has a plurality of mounting bosses;
wherein the stator is secured to the housing via a plurality of fasteners that are arranged in the plurality of mounting bosses and coupled to the housing;
wherein the insulator system includes a plurality of dielectric fastener encapsulators;
wherein the stator is secured to the housing via the plurality of fasteners; and
wherein the plurality of fasteners secure the stator to the housing with the plurality of dielectric fastener encapsulators interposed therebetween.

11. The electric machine of claim 10, wherein the insulator system being interposed between the stator core and the housing comprises the insulator system being a dielectric layer that is arranged between the stator core and the housing, wherein the dielectric layer electrically isolates the stator core from the housing.

12. The electric machine of claim 11, wherein the dielectric layer that is arranged between the stator core and the housing is fabricated from a polymeric material.

13. The electric machine of claim 11, wherein the dielectric layer that is arranged between the stator core and the housing has an impedance that is greater than a predetermined minimum resistance threshold, wherein the magnitude of the predetermined minimum resistance threshold minimizes a common mode electrical power transferred through the bearing system.

14. The electric machine of claim 11, wherein the dielectric layer arranged between the stator core and the housing comprises a dielectric spacer, wherein the dielectric spacer is interposed between the stator core and the housing.

15. The electric machine of claim 10, wherein:

the insulator system includes a dielectric spacer; and the stator core is secured to the housing with the dielectric spacer interposed therebetween.

16. The electric machine of claim 10, wherein the electric machine comprises a multiphase permanent magnet electric machine.

17. A method for assembling a permanent magnet electric machine, the method comprising:

interposing a dielectric insulator system between a stator core and a housing of the permanent magnet electric machine prior to inserting the stator core into the housing;

interposing a dielectric sleeve between the housing and the stator core;

inserting the stator core into the housing, including interposing a dielectric sleeve between the stator core and the housing;

interposing a dielectric spacer between the stator core and the housing assembling a plurality of dielectric fastener encapsulators into the housing;

securing the stator core onto the housing employing a plurality of fasteners, wherein the plurality of dielectric fastener encapsulators are interposed between the plurality of fasteners and the housing; and then removing the dielectric sleeve from between the rotor and the stator core.

18. The method of claim 17, wherein interposing the dielectric insulator system between the stator core and the housing prior to inserting the stator core into the housing comprises interposing a dielectric spacer between the stator core and the housing.

* * * * *